Oct. 22, 1935.  C. E. EKDAHL  2,018,549
MOUNTING FOR TELESCOPIC GUN SIGHTS
Filed March 21, 1935
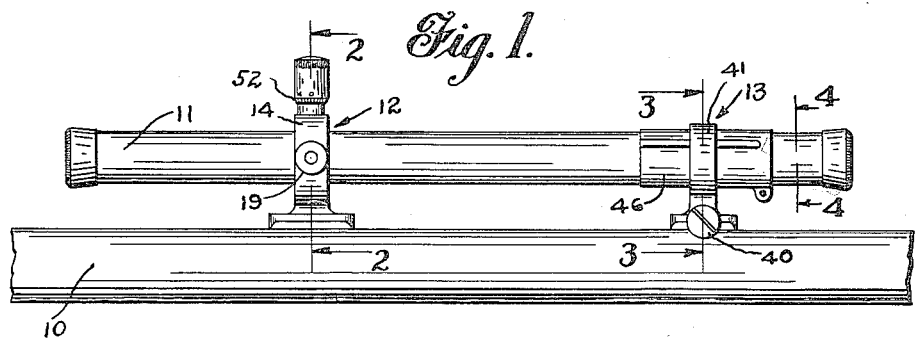
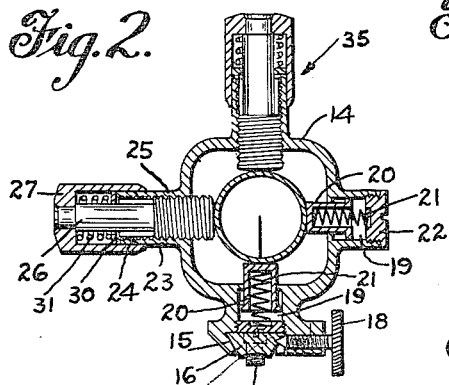
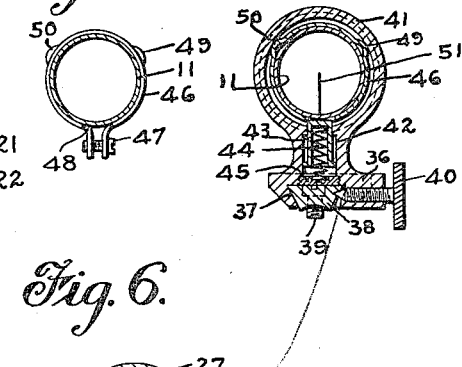
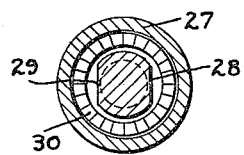
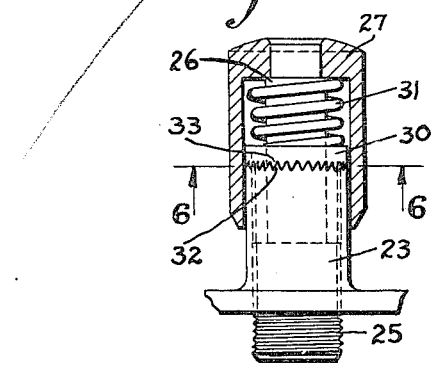
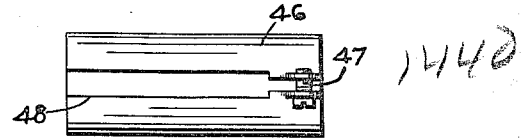
Inventor
Carl E. Ekdahl
By Rockwell & Bartholow
Attorney

UNITED STATES PATENT OFFICE 2,018,549

MOUNTING FOR TELESCOPIC GUN SIGHTS

Carl E. Ekdahl, New Haven, Conn., assignor to Marlin Firearms Company, New Haven, Conn., a corporation of Connecticut Application March 21, 1935, Serial No. 12,263

9 Claims. (Cl. 33—50)

The present invention relates to mountings for telescopic gun sights and more particularly to means for supporting the telescope upon the gun barrel in such a way that it may be accurately and conveniently adjusted for elevation and windage. The invention also relates to mounting means for a telescope so that it may be accurately placed upon the gun barrel with the telescopic sight in proper vertical alignment.

The telescopic sight usually employed with gun barrels consists of a telescope mounted upon the upper surface of a barrel in substantially parallel relation therewith. The telescope is usually supported at both its front and rear ends. Near the front end of the telescope a sight is arranged, and in the mounting of the telescope upon the gun barrel it is necessary to provide for this sight to stand in a correct vertical position. It is also usual for the mounting device at or adjacent the rear end of the telescope to provide means for adjusting this end of the telescope vertically and laterally. In the past, mounting devices which have been employed have been more or less expensive to manufacture, so that telescopic sights have only been employed by those who are able and willing to spend a considerable amount of money for such devices.

One object of the present invention is the provision of mounting devices for telescopic gun sights which will provide for the proper positioning of the telescope upon the gun barrel and for its easy and convenient adjustment for elevation and windage, and which at the same time may be manufactured economically so as to be sold for a relatively low price.

Another object of the invention is the provision of simple and inexpensive mounting devices for telescopic gun sights.

A further object of the invention is the provision of a mounting for telescopic gun sights which will provide for the adjustment of the telescope laterally or vertically to within very fine limits.

A still further object of the invention is the provision of a front support for a telescopic gun sight which will support the telescope upon the gun barrel in a proper position and at the same time be readily applied and economical to manufacture.

To these and other ends the invention consists in the novel features and combinations of parts to be hereinafter described and claimed.

In the accompanying drawing:

Fig. 1 is an elevational view of a telescopic gun sight embodying my improvements, the telescope being mounted upon a gun barrel shown in a fragmentary way;

Fig. 2 is a sectional view on line 2—2 of Fig. 1;
Fig. 3 is a sectional view on line 3—3 of Fig. 1;
Fig. 4 is a sectional view on line 4—4 of Fig. 1;
Fig. 5 is an enlarged view of the adjusting device for the rear end of the telescope;
Fig. 6 is a sectional view on line 6—6 of Fig. 5; and
Fig. 7 is an underneath view of the sleeve employed in connection with the mounting device for the front end of the telescope.

To illustrate a preferred embodiment of my invention, I have shown a gun barrel 10 upon which is mounted the usual telescope 11, the latter being in a position with its axis substantially parallel to the axis of the gun barrel and capable of adjustment at its rear end toward and from the barrel and also laterally with respect to the barrel, as will be hereinafter explained. The telescope is supported from the barrel by a rear mounting, designated generally by the numeral 12, and a front mounting, designated generally by the numeral 13.

As shown more particularly in Fig. 2, the rear mounting comprises a frame 14 provided at its lower end with a dove-tailed slot 15, within which is received a small correspondingly shaped block 16, the latter being secured to the gun barrel by screws 17. The frame 14 is slidable upon the block 16 and may be secured in the desired position by means of the setscrew 18 passing through a portion of the frame and tightened against the edge of the block.

The frame 14 is provided with openings 19 at the lower portion and at one side thereof, in which openings are slidably mounted plungers 20 urged inwardly by coil springs 21, the latter reacting against screw plugs 22 threaded into the frame at the outer end of the openings 19. As clearly shown in Fig. 2, these plungers impinge against the barrel of the telescope and urge the latter against the ends of the adjusting screws which work opposite the plungers, as will be explained hereinafter.

Two adjusting screws are shown, one working opposite one of the plungers to adjust the rear end of the telescope laterally, and the other working opposite the other plunger to effect a vertical adjustment. As the structure of these screws and cooperating elements is identical, one only will be described.

The frame 14 is provided with a tubular extension 23 threaded internally, as shown at 24, to receive the threaded adjusting screw 25, the end of which impinges against the tube or barrel of the telescope to force it against the plunger 20. This screw is provided with a shank 26 upon the end of which is secured, as by riveting, a member 27 by which the screw may be manually operated.

As shown in Fig. 6, the shank 26 is provided with the flat sides 28 and 29, and upon this shank is slidably mounted a washer 30, the opening of which is also provided with flat sides, so that while it slides freely upon the shank, it is non-rotatably mounted thereon. A coil spring 31 embraces the shank 26 between the washer and the member 27 so as to urge the washer inwardly toward the tubular extension 23.

The end face of the tubular extension is provided with teeth or serrations 32 and the end face of the washer is correspondingly serrated, as shown at 33, the washer and extension 23 having substantially the same diameters, and the member 27 being sufficiently large to telescope over the part 23.

It will be apparent that when the adjusting screw 25 is screwed into the part 23 so that the end of the screw bears against the barrel or tube of the telescope, the washer 30 will be forced against the end of the part 23 so that the serrations or teeth 32 and 33 on these parts will become engaged. When the member 27 is turned to adjust the screw 25, the washer 30 will also be rotated relatively to the tubular member 23. The spring 31 will allow the washer to move outwardly to permit the high points of the teeth 33 to pass over the high points of the teeth 32 with the usual clicking noise which indicates that the adjustment is being made. It will be understood that a very fine adjustment can be made with this arrangement, owing to the fact that the teeth 32 and 33 can be made very small and it is quite easy to make an adjustment of a space of one tooth. This, of course, turns the threaded screw 25 a very slight distance so as to make an adjustment of one one-thousandth of an inch in the position of the tube of the telescope.

As has already been intimated, a similar adjusting device 35 is arranged at the upper portion of the frame 14.

The mounting device 13 at the forward end of the telescope likewise comprises a base or support 36 provided with a dovetailed slot 37 to slidingly receive a correspondingly shaped block 38 secured to the gun barrel by the screws 39. The part 36 may be secured in place upon the block 38 by the setscrew 40. Upon the base 36 is mounted a ring 41, with which an opening 42 in the base communicates. Within the opening 42 is mounted a plunger 43 forced upwardly by the spring 44, which is in turn seated upon a screw plug 45.

A split sleeve 46 is mounted upon the telescope, the parts of this sleeve being drawn together by means of the screw 47, and a relatively wide slot 48 is provided at the meeting edges of the sleeve.

As shown more particularly in Figs. 1 and 4, this sleeve is provided with two longitudinal ribs 49 and 50 to bear against the inner periphery of the ring 41, as shown in Fig. 3. As is usual, the telescope is provided with the vertical sight 51.

In mounting the telescope upon the gun, the sleeve 46 is placed upon the tube or barrel of the telescope and slipped rearwardly through the ring 41, the plunger 43 entering the slot 48, in which it has a fairly close fit. The tube of the telescope is then adjusted until the sight 51 is in a correct vertical position and the screw 47 is tightened. It will be apparent that the telescope will thereafter be held in this position, as the engagement of the end of the plunger 43 in the slot 48 will prevent any rotative movement of the sleeve and also of the telescope as the sleeve is clamped tightly around the telescope tube. Likewise, the plunger 43 forces the ribs 49 and 50 against the inner circumference of the ring 41 so as to provide a three point bearing for the telescope within the mounting ring. This prevents any shifting of the telescope within the ring and holds the telescope securely in place.

The member 27 is tubular or cup-shaped and telescopes over the tubular extension or sleeve 23. This member also may have indicia thereon, as shown at 52 in Fig. 1, to indicate the amount of adjustment which is made.

While I have shown and described a preferred embodiment of my invention, it will be understood that it is not to be limited to all of the details shown, but is capable of modification and variation within the spirit of the invention and within the scope of the appended claims.

What I claim is:

1. A mounting for telescopic gun sights comprising a member for attachment to the gun and having an opening adapted to receive a telescope, a manually operable adjusting screw threaded to said member and adapted to engage and adjust the telescope within said opening, a spring-pressed abutment to oppose said screw, said screw being provided with a shank having a manually manipulable element thereon, and a spring-pressed member on said shank to engage the member and vary the resistance to the turning of the screw.

2. A mounting for telescopic gun sights comprising a member for attachment to the gun and having an opening adapted to receive a telescope, a manually operable adjusting screw threaded to said member and adapted to engage and adjust the telescope wtihin said opening, a spring-pressed abutment to oppose said screw, said screw having a shank portion by which it may be rotated, a washer slidably but non-rotatably mounted on said shank portion, a spring surrounding said shank to force said washer inwardly toward said member, and cooperating means on the opposing portions of the washer and member to vary the resistance to the rotation of the screw.

3. A mounting for telescope gun sights comprising a member for attachment to the gun and having an opening adapted to receive a telescope, a manually operable adjusting screw threaded to said member and adapted to engage and adjust the telescope within said opening, a spring-pressed abutment to oppose said screw, said screw having a shank by which it is rotated, a washer slidably and non-rotatably mounted on said shank, a spring surrounding the shank and urging said washer inwardly toward the member, and the opposing surfaces of said member and washer being provided with cooperating serrations to vary the resistance to the turning of the screw.

4. A mounting for telescopic gun sights comprising a member for attachment to the gun and having an opening adapted to receive a telescope, a manually operable adjusting screw threaded to said member and adapted to engage and adjust the telescope within said opening, a spring-pressed abutment to oppose said screw, said member being provided with a projecting sleeve portion to receive said screw, said screw being provided with a shank projecting from the sleeve portion by which it may be manually manipulated, a washer slidably but non-rotatably mounted on the shank and spring-pressed toward said sleeve, and the end surface of said sleeve and the opposing face of the washer being provided with cooperating teeth to vary the resistance to the turning of the screw.

5. A mounting for telescopic gun sights comprising a member for attachment to the gun and having an opening adapted to receive a telescope, a manually operable adjusting screw threaded to said member and adapted to engage and adjust the telescope within said opening, a spring-pressed abutment to oppose said screw, said member being provided with a projecting sleeve portion to receive said screw, said screw being provided with a shank projecting from the sleeve portion by which it may be manually manipulated, a washer slidably mounted on the shank and spring-pressed toward said sleeve, the end surface of said sleeve and the opposing face of the washer being provided with cooperating teeth to vary the resistance to the turning of the screw, said shank being provided with a non-circular cross section, and the opening in said washer being correspondingly shaped to effect rotation of the washer with the shank.

6. A mounting for telescopic gun sights comprising a member for attachment to the gun and having an opening adapted to receive a telescope, a manually operable adjusting screw threaded to said member and adapted to engage and adjust the telescope within said opening, a spring-pressed abutment to oppose said screw, said member being provided with a projecting sleeve portion to receive said screw, said screw being provided with a shank projecting from the sleeve portion by which it may be manually manipulated, a washer slidably but non-rotatably mounted on the shank and spring-pressed toward said sleeve, the end surface of said sleeve and the opposing face of the washer being provided with cooperating teeth to vary the resistance to the turning of the screw, and a manually operable member secured to the end of said shank to cover the spring and telescope over the sleeve portion.

7. A mounting for telescopic gun sights comprising a member for attachment to the gun and having an opening to receive the telescope, a split sleeve adapted to embrace the telescope and provided with longitudinal ridges, there being a relatively wide slot formed by the meeting edges of said sleeve, and said member being provided with a spring-pressed plunger entering said opening and engaging in the slot in the sleeve to hold the telescope in position.

8. A mounting for telescopic gun sights comprising a member for attachment to the gun and having an opening to receive the telescope, a split sleeve adapted to embrace the telescope and provided with longitudinal ridges, there being a relatively wide slot formed by the meeting edges of said sleeve, said member being provided with a spring-pressed plunger entering said opening and engaging in the slot in the sleeve to hold the telescope in position, and said sleeve being adjustable to permit rotative adjustment of the telescope on the gun barrel.

9. A mounting for telescopic gun sights comprising a split sleeve adapted to embrace the telescope, said sleeve being provided with a pair of spaced longitudinal ribs and a slot spaced from said ribs, a ring-like member adapted to be attached to the gun barrel within which said sleeve is received, and a spring-pressed plunger mounted in the ring-like member, said plunger being adapted to enter said slot to prevent rotation of the sleeve and to force said ribs against the inner periphery of the ring-like member.

CARL E. EKDAHL.